(12) United States Patent
Zakonov et al.

(10) Patent No.: US 8,032,792 B2
(45) Date of Patent: Oct. 4, 2011

(54) DYNAMIC DISCOVERY ALGORITHM

(75) Inventors: Alex Zakonov, Manchester, CT (US);
Victor Mushkatin, West Hartford, CT (US); Vladimir Nazarov, Saint-Petersberg (RU)

(73) Assignee: Avicode, Inc., Baltimore, MD (US)

( * ) Notice: Subject to any disclaimer, the term of this patent is extended or adjusted under 35 U.S.C. 154(b) by 702 days.

(21) Appl. No.: 10/564,106

(22) PCT Filed: Jul. 9, 2004

(86) PCT No.: PCT/US2004/021871
§ 371 (c)(1),
(2), (4) Date: Jan. 9, 2006

(87) PCT Pub. No.: WO2005/008496
PCT Pub. Date: Jan. 27, 2005

(65) Prior Publication Data
US 2006/0168478 A1    Jul. 27, 2006

Related U.S. Application Data

(60) Provisional application No. 60/486,560, filed on Jul. 11, 2003.

(51) Int. Cl.
*G06F 11/00* (2006.01)
(52) U.S. Cl. .................................................. 714/38.1
(58) Field of Classification Search ............... 714/38
See application file for complete search history.

(56) References Cited

U.S. PATENT DOCUMENTS
7,263,632 B2 * 8/2007 Ritz et al. .................. 714/25
* cited by examiner

*Primary Examiner* — Scott T Baderman
*Assistant Examiner* — Jigar Patel
(74) *Attorney, Agent, or Firm* — Steven McHugh

(57) ABSTRACT

A method for monitoring exception events generated by a software application including operating the software application to generate exception event data responsive to an exception event, monitoring the software application to identify an occurrence of the exception event and to obtain the exception event data, examining the exception event data to determine type of the exception event and processing the exception event data responsive to the type of the exception event.

15 Claims, 4 Drawing Sheets

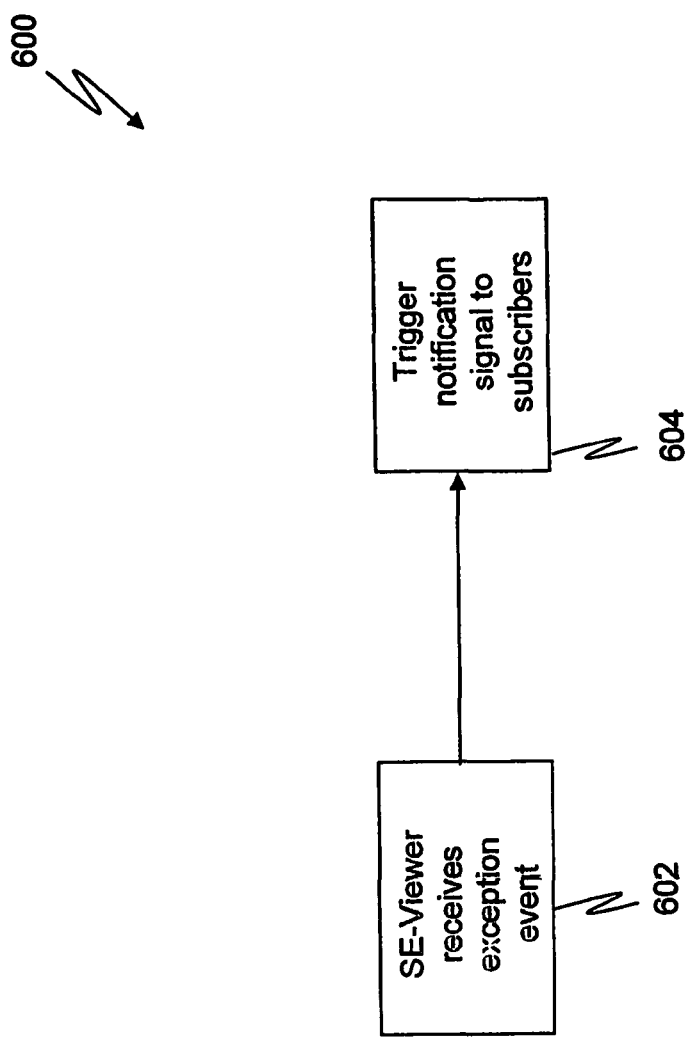

DYNAMIC DISCOVERY ALGORITHM

RELATED APPLICATIONS

This application is the National Phase Application under 35 U.S.C. §371 of PCT International Application No. PCT/US04/21871 which has an International filing date of Jul. 9, 2004, which designated the United States of America and which claims priority of U.S. Provisional Patent Application No. 60/486,560 filed Jul. 11, 2003 the contents of which are hereby incorporated by reference herein

FIELD OF THE INVENTION

This disclosure relates generally to software fault management and more particularly to a method for monitoring faults generated by a software application.

BACKGROUND OF THE INVENTION

Systems that run application software typically employ a Fault Management System (hereinafter "FMS") to monitor and manage any faults that occur in the system. As such, an FMS must be able to identify situations that constitute a fault condition and then determine what information needs to be collected about that particular fault situation. A typical FMS includes at least one software application to be monitored, at least one monitoring agent and at least one fault event management system. When the software application being monitored encounters a fault situation, the software application generates a fault event message which is captured by the monitoring agent and reported to the fault event management system.

Currently, a number of different approaches are used to determine what situations constitute a fault situation and, in the event of a fault situation, what information regarding the fault situation should be collected and reported. For example, one approach may be to leave the fault situation determination up to the developer. Thus, the developer will program in specific event situations that constitute a fault event. Unfortunately, however, this approach has several disadvantages. One disadvantage occurs because the FMS completely relies on the software application being monitored to provide all of the required information regarding the fault event and if the application fails to report a fault event to the FMS, the FMS has no information regarding the fault event. Another disadvantage occurs because the fault event information to be reported to the FMS is defined during the development of the software application and is thus, 'hard' programmed into the software. In this situation, the fault event information to be reported to the FMS is not easily modified and cannot be adjusted 'on-the-fly'. Thus, if the reported fault event information is not sufficient for issue resolution, modifications to the software application are necessary in order to collect more information and troubleshoot the cause of the fault event.

Still another disadvantage occurs when, at a section of the source code where a fault event occurs, the developer may not have sufficient information to decide if the fault event is a critical event, whether the fault event needs to be reported to the FMS or if the fault event should be handled by the software application itself. For example, consider the situation where a software application comprises two components, a Business Component (BC) and a File Access Component (FAC), where the BC uses the FAC for all file related operations and where an exception (i.e. a fault event) occurs when the FAC attempts to access a specific file. The moment the exception occurs, the FAC will have all of the information about the application environment, such as file name, file path, current settings, etc. However, at this point, the FAC does not have enough information to determine whether the BC will correctly handle the exception. Moreover, although the BC has enough information to determine whether the exception is a critical exception, the BC does not have information about the exception environment besides that information that is reported by the FAC. Thus, when an exception occurs, the software application has all of the information about the exception environment, but no information regarding the criticality of the exception and when the software application does have information regarding the criticality of the exception, the exception environment does not exist.

One way to solve this problem would be to collect all known information about the exception environment and provide this information to upper level components, allowing these components to make decisions about the criticality of the exception. Unfortunately however, because the application would spend a significant amount of time collecting information regarding the exception environment, this approach may seriously affect the performance and scalability of the application. Another way to solve this problem would be to collect minimal information regarding the exception environment and to provide this information to an upper level component. Unfortunately however, while this approach does not appear to impact application performance, it may lead to situations where there is not enough information to trouble shoot an issue, thus leading to the same problems listed above.

One alternative approach to relying on the software developer for application fault reporting involves performing an Automated Static Instrumentation of the code. For example, once an application has been developed, the application is process using an instrumentation tool which adds exception management code onto the source code or at the binary level. The resultant, or processed, code is then used. Unfortunately, although this approach resolves the issue of the FMS relying on the software application being monitored to detect and report fault situations, the problem of static amounts of reported information and the inability to distinguish between critical exceptions and non-critical exceptions at the moment the exception occurs still exists.

SUMMARY OF THE INVENTION

A method for monitoring exception events generated by a software application is also provided and includes operating the software application to generate exception event data, monitoring the software application to obtain the exception event data, determining a category for the obtained exception event data and processing the obtained exception event data responsive to the determined category.

A system for operating a software application in a .NET framework is also provided, wherein the system includes machine-readable computer program code including instructions for causing a controller to implement a method for monitoring exception events generated by the software application, wherein the method includes operating the software application to generate exception event data responsive to an exception event, monitoring the software application to identify an occurrence of the exception event and to obtain the exception event data, examining the exception event data to determine the type of the exception event and processing the exception event data responsive to the type of the exception event.

A medium encoded with a machine-readable computer program code is provided, wherein the program code includes instructions for causing a controller to implement a method for monitoring exception events generated by a software application. The method includes operating the software application to generate exception event data responsive to an exception event, monitoring the software application to identify an occurrence of the exception event and to obtain the exception event data, examining the exception event data to determine the type of the exception event and processing the exception event data responsive to the type of the exception event.

Furthermore, a machine-readable computer program code is provided, wherein the program code includes instructions for causing a controller to implement a method for monitoring exception events generated by a software application, wherein the method includes operating the software application to generate exception event data responsive to an exception event, monitoring the software application to identify an occurrence of the exception event and to obtain exception event data, examining the exception event data to determine the type of the exception event and processing the exception event data responsive to the type of the exception event.

BRIEF DESCRIPTION OF DRAWINGS

The foregoing and other features and advantages of the present invention will be more fully understood from the following detailed description of illustrative embodiments, taken in conjunction with the accompanying drawings in which like elements are numbered alike in the several Figures:

FIG. 4 is a block diagram illustrating an indirect integration approach for implementing the method of FIG. 1.

DETAILED DESCRIPTION OF THE INVENTION

Figure 1:
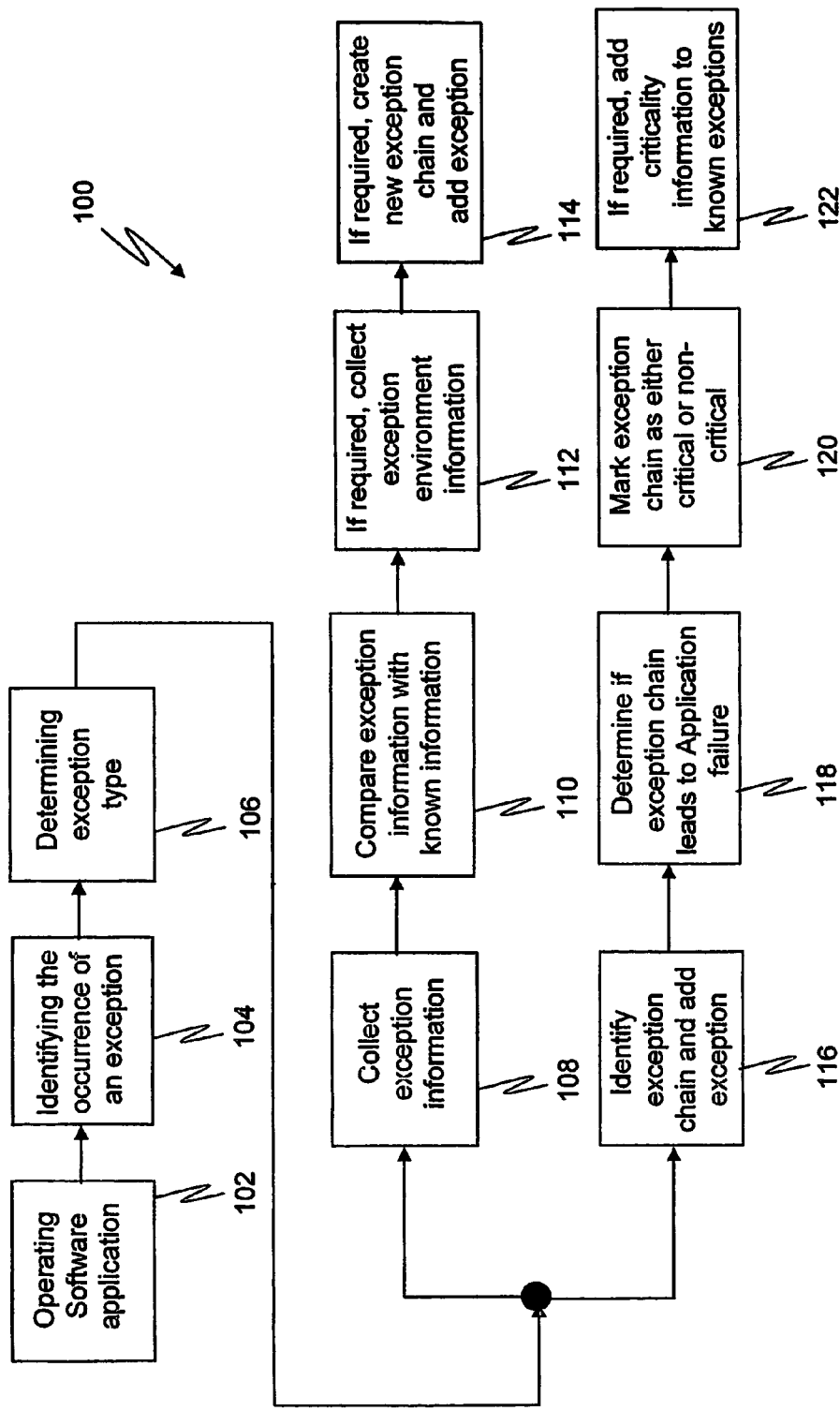
FIG. 1 is a block diagram describing a method for monitoring faults generated by a software application.

Referring to FIG. 1, a method 100 for monitoring faults generated by a software application operating in a production environment in the .NET framework is illustrated and includes operating a software application in a .NET framework, as shown in block 102, and monitoring the software application to identify the occurrence of a fault exception, as shown in block 104. Once an exception occurs, a determination is made as to whether the exception is a primary exception or a derived exception, as shown in block 106, wherein a primary exception is a first exception event in a chain of exception events and is typically the root cause of the exceptional situation and wherein, a derived exception is typically a result of 'catch-throw' blocks in the exception handling logic of the upper levels of the call stack.

One way to accomplish this determination is by using the concept of an "Exception Chain" to distinguish between a primary exception and a derived exception. For example, once an exception event occurs, the exception event may be examined to see if the exception event is the first occurrence of an exception event in a chain of exception events. If it is determined that the exception event is the first occurrence of an exception event in a chain of exception events, then the exception event is identified as a primary exception. If it is determined that the exception event is not the first occurrence of an exception event in a chain of exception events, then the exception event is identified as a derived exception.

If it is determined that the exception event is a primary exception, then information regarding the exception event is collected, as shown in block 108. The collected exception event information is compared with known exception event information contained within an exception information database, as shown in block 110, in order to identify any matching exception event information. The exception information database may be an existing database or a database created by method 100 that is used to store collected information about exception events. The current exception event information and any matching exception event information contained within the exception information database, is then examined to determine if the current exception event is an exception event that will lead to a failure of the software application. If the exception event does lead to an application failure then the exception event is labeled as a critical exception event. If the exception event does not lead to an application failure, then the exception event is labeled as a non-critical exception event.

If an exception information match is identified and if it is determined that the exception is a critical exception, information responsive to the exception environment including, but not limited to, function parameters, local variables and object variables is collected, as shown in block 112. However, if it is determined that the exception event is a non-critical exception event then no exception environment information collection may occur, thus allowing valuable execution time to be conserved. On the other hand, if there is no matching information found in the exception information database then additional information responsive to the exception environment may be collected, a new exception chain may be created and the collected information may be added to the newly created exception chain, as shown in step 114.

If it is determined that the exception event is a derived exception, the exception chain is identified and the exception event is added to the exception chain, as shown in block 116. As above, the exception chain is examined to determine if the exception chain leads to an application failure, as shown in block 118. If the exception chain does lead to an application failure, then the primary exception in the exception chain is marked as a critical exception, as shown in block 120. However, if the exception chain does not lead to an application failure then the primary exception in the exception chain is marked as a non-critical exception, also as shown in block 120. The criticality information about the primary exception may then be added to the exception information database of well-known exceptions, as shown in block 122.

It should be appreciated that method 100 may differentiate between critical (unhandled) and non-critical (handled) exceptions at the moment the exception occurs by introducing the concept of "exception location", wherein the exception location is a list of functions disposed in the call stack at the moment the exception occurs. For example, if two exceptions occur, each having the same exception class and exception location, then in most cases the exceptions will have the same criticality. Thus, if the first exception is critical (unhandled), then the second exception may also be considered critical, with the same holding true for handled exceptions. As such, method 100 may rely on this assumption to define the criticality of an exception at the point when the exception occurs.

When an exception event occurs for the first time, method 100 may collect and store information about the exception event, e.g. exception class and exception location, into the exception information database of well-known exception events. The intercept monitor software may then track the exception event through its lifecycle to see if one of the functions up the call stack handles the exception. If a similar exception event occurs again, information may then be collected about the exception event, e.g. exception class and exception location, and compared to information within the exception information database. If the combination of exception class and exception location is in the exception information database, then the decision for collecting the exception environment information may be based upon the criticality information for the two exceptions in the exception information database.

This approach to fault monitoring resolves the problem of static amounts of reported information and the inability to immediately distinguish between handled exceptions and unhandled exceptions. Additionally, method 100 does not rely on the software application being monitored to report an exception event.

Moreover, method 100 may collect information about the application exception event(s), track the application exception event(s) using the exception callback of the CLR debugging API and distinguish between a plurality of exception event categories, including Critical Exceptions (e.g. exceptions that lead to a failure of a monitored component), Non-Critical Exceptions (e.g. exceptions that the application being monitored handles) and Disabled Exceptions (e.g. exceptions that are unrelated to the application being monitored and that are disabled in some configurations). It should be appreciated that method 100 may collect exception information, track exception event(s) and/or distinguish between exception event categories via any method suitable to the desired end purpose and is not limited to the method(s) described herein.

Method 100 may employ a self-learning approach to collect data about application behavior and to detect non-critical exceptions at an early stage. Additionally, method 100 may rely on the assumption that a typical software application does not use exceptions during normal application flow. If an application does use exceptions in normal application flow, method 100 may provide the ability to disable those classes of exception events manually to minimize the effect on server performance.

It should also be appreciated that although method 100, as discussed herein, is discussed in the context of a software application that seamlessly integrates into a .NET framework, that provides a rich Application Programming Interface (hereinafter "API") for customization purposes and that is compatible with Windows Management Instrumentation (hereinafter "WMI"), method 100 may be used in any context and/or framework suitable to the desired end purpose. Method 100 may also be implemented using a single software application or by using a software application having a plurality of software modules that may work together or separately.

Figure 2:
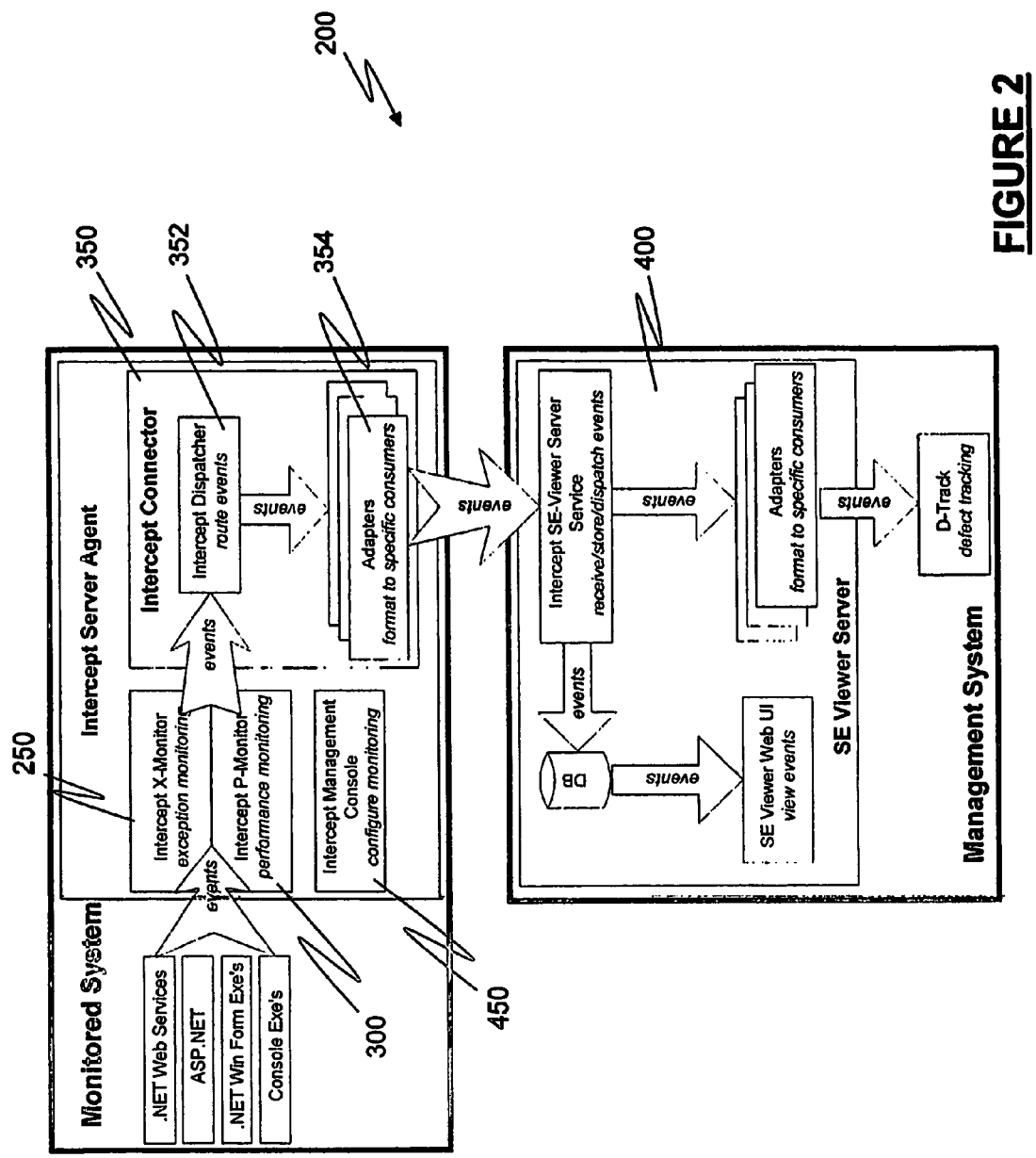
FIG. 2 is a block diagram illustrating the architecture of a system employing a fault monitor software module for implementing the method of FIG. 1.

Referring to FIG. 2, a block diagram illustrating one embodiment of an architecture of an Intercept Studio Software Application (Intercept Studio) 200 is shown and may include an X-Intercept Monitor Software Module (X-Monitor) 250, a P-Intercept Monitor Software Module (P-Monitor) 300, an Intercept Connector Module (ICM) 350, a Centralized Exception Event Management System Module (SE-Viewer) 400 and an Intercept Management Console Module (IMC) 450.

X-Monitor 250 is a software module provided for implementing method 100 for monitoring application software and filtering out non-critical (handled) exception events at an early stage with a minimal impact on performance to the application software being monitored. X-Monitor 250 may collect exception context information including the call stack, function parameters, local variables and object variables and may provide the capability for users to easily adjust the level of detail to limit the alerts to specific transactions, locations and/or groups. A P-Monitor 300 software module may be provided for monitoring the performance of the application software and collecting performance information regarding any communications between monitored components and external systems, including but not limited to, SQL servers, Web Services, TCP/IP servers and OLEDB providers. Moreover, P-Monitor 300 may or may not add information about calls to performance events and track request times for external calls, checking to see if request times exceed predefined threshold levels. As a brief overview, P-Monitor 300 may collect performance data responsive to the operation of a software application within the .NET framework and then determine whether predefined performance thresholds have been exceeded. P-monitor 300 may then add information about performance data to the performance events.

ICM 350 may be provided for routing exception events to exception event consumers, wherein ICM 350 may include an exception event dispatcher 352 and at least one ICM Adapter 354. The ICM Adapter 354 may be responsible for communications between the exception event dispatcher 352 and the exception event consumers to remove the dependency between the exception event dispatcher 352 and the exception event consumers and allowing multiple event consumers to be supported. SE-Viewer 400 may be provided for enterprise monitoring capabilities and may be communicated with X-Monitor 250 and P-Monitor 300 to allow for the monitoring of deployed .NET applications for slowdowns, faults and failures and to immediately pinpoint the cause of any problem that may occur. SE-Viewer 400 may also allow for a root cause diagnosis to be conducted down to the source-code level without altering the source code and may support a rich event notification infrastructure that may be integrated with an operations management system, including but not limited to, Microsoft Operating Manager (MOM), Tivoli, BMC and HP OpenView. It should be appreciated that SE-Viewer 400 may also include capabilities allowing for the advanced configuration of notifications, including but not limited to, frequency of alerts and mode of transmission (e-mail, pager, SMS and/or www).

Furthermore, IMC 450 may be included for configuring which software applications should be monitored. Thus, IMC 450 may allow a system administrator to add applications to be monitored, to select whether the application performance should be monitored, to select whether the exception event should be monitored or both and/or to set threshold levels and/or options.

X-Monitor 250 and P-Monitor 300 may be integrated, together or separately, with a third party operation management and issue tracking system, such as Microsoft Operating Manager (MOM), Tivoli, BMC and HP Open View using a direct integration methodology 500 or by using an indirect integration methodology 600 via an intermediary.

Figure 3:
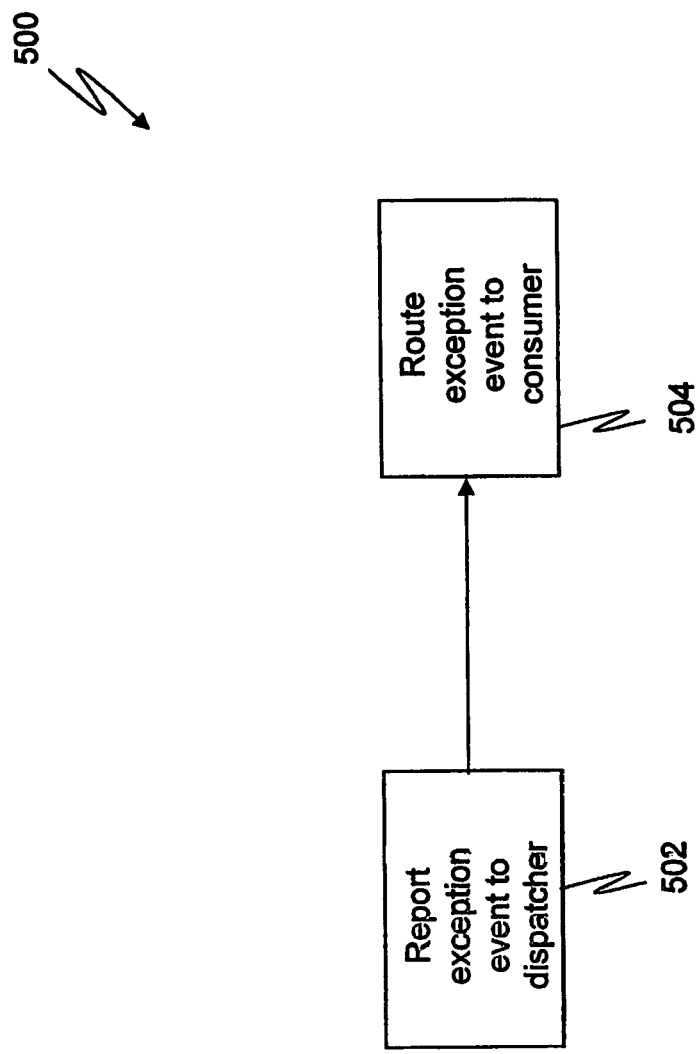
FIG. 3 is a block diagram illustrating a direct integration approach for implementing the method of FIG. 1.

Referring to FIG. 3, a block diagram illustrating a direct integration methodology 500 is shown and described. Using direct integration methodology 500, Intercept Studio 200 includes code for implementing method 100 and assumes that a third party management system will take full responsibility for any exception events, including but not limited to, exception event delivery, exception event storage, exception event consolidation, exception event visualization and/or exception event interpretation. Intercept Studio 200 may rely on a software intercept connection which includes an exception event dispatcher and at least one connection adapter.

Referring again to FIG. 3, when method 100 has determined that an exception event has occurred, the exception event is reported to the exception event dispatcher, as shown in block 502. The exception event dispatcher routes the exception event to an appropriate consumer's exception event class and exception event source, as shown in block 504. Because the at least one connection adapters is responsible for any communications between the exception event dispatcher and the exception event consumer, the at least one connection adapter removes any dependency between the exception event dispatcher and the exception event consumer, thus allowing multiple exception event consumer's to be supported. The at least one connection adapter may include, but is not limited to, an SE-Viewer adapter, a WMI adapter and/or a Windows exception event log adapter, wherein the WMI adapter may also enable communication with any WMI compatible operations management system.

Referring to FIG. 4, a block diagram illustrating indirect integration methodology 600 is shown and described. It should be appreciated that using indirect integration method 600, Intercept Studio 200 also includes code for implementing method 100 and uses an SE-Viewer as an intermediary between an intercept monitor software application and a third party management system. It should further be appreciated that the requirements for third party event management systems are simpler because the SE-Viewer performs many of the tasks of the third party event management system, including but limited to, exception event delivery, exception event storage, exception event visualization and exception event interpretation. Moreover, it should also be appreciated that the third party management system may only be responsible for managing the links to the exception events. In this scenario, the SE-Viewer relies on the exception event notification mechanism. As such, when the SE-Viewer receives an exception event, as shown in block 602, the SE-Viewer triggers a notification signal that is sent to SE-Viewer subscribers, as shown in block 604, wherein the SE-Viewer provides a standard API for developing notification subscribers. Notification subscribers may include Windows Event Log notification, WMI notification and e-mail notification, wherein Windows Event Log notification and WMI notification are intended for integration with third party network operation management systems. In this case however, the SE-Viewer server may be responsible for the initial exception event delivery, exception event storage and exception event visualization and the third party operation management system only holds a link to the exception event stored in the SE-Viewer server.

As described above, the method 100 of FIG. 1, in whole or in part, may be embodied in the form of computer-implemented processes and apparatuses for practicing those processes. The method 100 of FIG. 1, in whole or in part, may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Existing systems having reprogrammable storage (e.g., flash memory) may be updated to implement the method of FIG. 1, in whole or in part.

Also as described above, the method 100 of FIG. 1, in whole or in part, may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments may configure the microprocessor to create specific logic circuits.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A method for monitoring application exceptions generated by a software application, the method being executed by a processing device and comprising:
   dynamically identifying an occurrence of an application exception generated by the software application prior to said application exception being sensed by the software application and logged;
   collecting exception data responsive to said application exception;
   examining said exception data, prior to said application exception being logged, to determine whether said application exception is a critical exception that will lead to a failure of said application and to identify critical exception data;
   dynamically determining whether said critical exception is a primary exception or a derived exception, prior to said application exception being logged; and
   logging said critical exception data to a storage device responsive to whether said critical exception is said primary exception or said derived exception.

2. The method of claim 1, wherein said operating includes operating said software application in at least one of a .NET framework and a J2EE framework.

3. The method of claim 1, further comprising processing said critical exception data responsive to at least one of said primary critical exception and said derived critical exception.

4. The method of claim 1, wherein said examining includes examining said critical exception data to determine if an exception chain exists.

5. The method of claim 3, wherein said processing further includes collecting critical exception data responsive to said critical exception and creating an exception information database.

6. The method of claim 5, wherein said processing further includes creating a critical exception chain.

7. The method of claim 4, wherein said processing further includes associating said collected critical exception data with said critical exception chain.

8. The method of claim 1, wherein said examining further includes comparing said exception data with data contained within an exception information database to determine whether said exception is said critical exception.

9. The method of claim 1, wherein said examining further includes labeling said exception as at least one of a critical exception, a non-critical exception, a derived exception and a primary exception.

10. The method of claim 9, wherein said processing further includes updating said exception information database with said exception data.

11. A system for operating a software application in a predefined framework, wherein the system includes a processor configured to execute machine-readable computer program code including instructions for causing a controller to implement a method for monitoring an application exception generated by the software application, the method comprising, comprising:
- operating the software application to generate exception data responsive to an application exception;
- dynamically identifying said application exception generated by the software application prior to said application exception being sensed by the software application and logged;
- collecting exception data responsive to said application exception;
- examining said exception data, prior to said application exception being logged, to determine whether said application exception is a critical exception that will lead to a failure of said application and to identify critical exception data;
- dynamically determining whether said critical exception is a primary exception or a derived exception, prior to said application exception being logged; and
- logging said critical exception data to a storage means responsive to whether said critical exception is said primary exception or said derived exception.

12. The system of claim 11, wherein said examining includes examining said critical exception data to determine whether said critical exception is at least one of said primary critical exception and said derived critical exception.

13. The system of claim 11, wherein said predefined framework is at least one of a .NET framework and a J2EE framework.

14. The system of claim 11, further comprising processing said critical exception data responsive to at least one of said primary critical exception and said derivative critical exception.

15. A computer-readable storage medium encoded with a machine-readable computer program code, the program code including instructions for causing a controller to implement a method for monitoring application exceptions generated by a software application, the method comprising:
- dynamically identifying an occurrence of an application exception generated by the software application prior to said application exception being sensed by the software application and logged;
- collecting exception data responsive to said application exception;
- examining said exception data, prior to said application exception being logged, to determine whether said application exception is a critical exception that will lead to a failure of said application and to identify critical exception data;
- dynamically determining whether said critical exception is a primary exception or a derived exception, prior to said application exception being logged; and
- logging said critical exception data to a storage device responsive to whether said critical exception is said primary exception or said derived exception.

* * * * *